(12) United States Patent
Adachi et al.

(10) Patent No.: US 10,927,954 B2
(45) Date of Patent: Feb. 23, 2021

(54) GASKET-MOUNTING STRUCTURE AND GASKET

(71) Applicant: NIPPON PILLAR PACKING CO., LTD., Osaka (JP)

(72) Inventors: Tomohiro Adachi, Osaka (JP); Atsushi Nakano, Osaka (JP); Tomoyuki Koike, Osaka (JP); Kazukiyo Teshima, Osaka (JP); Motoaki Naruo, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 22 days.

(21) Appl. No.: 16/400,053

(22) Filed: May 1, 2019

(65) Prior Publication Data

US 2019/0368609 A1    Dec. 5, 2019

(30) Foreign Application Priority Data

Jun. 1, 2018    (JP) .............................. JP2018-106393

(51) Int. Cl.
| | |
|---|---|
| *F16J 15/02* | (2006.01) |
| *F16J 15/06* | (2006.01) |
| *F16J 15/10* | (2006.01) |
| *F16L 23/22* | (2006.01) |
| *F16L 23/16* | (2006.01) |

(52) U.S. Cl.
CPC .......... *F16J 15/062* (2013.01); *F16J 15/102* (2013.01); *F16L 23/162* (2013.01); *F16L 23/22* (2013.01)

(58) Field of Classification Search
CPC ........ F16J 15/102; F16J 15/104; F16J 15/062; F16L 23/22; F16L 23/162
See application file for complete search history.

(56) References Cited

U.S. PATENT DOCUMENTS

| | | | | |
|---|---|---|---|---|
| 4,410,186 | A | * 10/1983 | Pierce, Jr. ............... | F16L 23/20 277/318 |
| 5,431,417 | A | * 7/1995 | Dahlgren ................ | F16L 23/20 277/614 |
| 5,433,454 | A | * 7/1995 | Ramberg ............... | F16J 15/062 277/614 |
| 2015/0176744 | A1* | 6/2015 | Glassman ............. | F16J 15/002 277/609 |

FOREIGN PATENT DOCUMENTS

| | | | |
|---|---|---|---|
| JP | 55115659 A | * | 9/1980 |
| JP | 2006-153180 | | 6/2006 |

\* cited by examiner

*Primary Examiner* — Gilbert Y Lee
(74) *Attorney, Agent, or Firm* — Oblon, McClelland, Maier & Neustadt, L.L.P.

(57) ABSTRACT

A structure allowing a gasket to be mounted on a fluid device is provided. The gasket includes an annular attaching portion that has a first slope at an axial end. The fluid device includes an annular attached portion with a second slope that contacts the first slope. The first slope at least partially includes two or more pressing areas, which are partitioned by annular steps. The second slope at least partially includes two or more pressed areas, which are partitioned by annular steps to fit the steps between the pressing areas.

2 Claims, 9 Drawing Sheets

GASKET-MOUNTING STRUCTURE AND GASKET

TECHNICAL FIELD

The invention relates to gasket-mounting structures and gaskets.

BACKGROUND ART

A gasket-mounting structure is known, which is disclosed in JP 2006-153180 A, for example. The structure allows a gasket to be mounted on a first flange pipe and to seal the gap between the gasket and the flange pipe. While the first flange pipe has a reverse-tapered face at the inner periphery of the tip of its first connection end, the gasket has a tapered face at the outer periphery of the tip of its second connection end. The reverse-tapered face contacts the tapered face. The structure allows the reverse-tapered face of the first flange pipe and the tapered face of the gasket to be tightly pressed against each other when the gasket is being mounted on the first flange pipe. Thus, a sealing area is provided between the reverse-tapered face and the tapered face.

SUMMARY OF THE INVENTION

In each conventional gasket-mounting structure, the reverse-tapered face of a fluid device and the tapered face of a gasket are planes parallel to each other; the profiles in their vertical cross sections are parallel lines. The parallel planes are pressed against each other to form a sealing area. Accordingly, the gasket-mounting structure needs an external force properly exerted on the gasket, which results in pressure that the entirety of the reverse-tapered face of the fluid device receives from the entirety of the tapered face of the gasket. Surely forming the sealing area requires carefully mounting the gasket on the fluid device to allow the reverse-tapered face of the fluid device and the tapered face of the gasket to be tightly pressed against each other.

To solve the above-described problems, the invention is provided. An object of the invention is to surely and easily seal the gap between a gasket and a fluid device.

According to a first aspect of the invention, a structure allows a gasket to be mounted on a fluid device. The gasket includes an annular attaching portion that has a first slope at an axial end. The fluid device includes an annular attached portion with a second slope that contacts the first slope. The first slope at least partially includes two or more pressing areas, which are annular steps. The second slope at least partially includes two or more pressed areas, which are annular steps to fit the pressing areas.

According to a second aspect of the invention, a structure allows a gasket to be mounted on a fluid device. The gasket includes an annular attaching portion that has a first slope at an axial end. The fluid device includes an annular attached portion with a second slope that contacts the first slope. One of the first slope and the second slope at least partially includes two or more pressing areas, which are annular protrusions. The other of the first slope and the second slope at least partially includes two or more pressed areas, which fit the pressing areas.

According to a third aspect of the invention, a gasket is to be mounted on a fluid device, including an annular attaching portion that has a first slope at an axial end. The first slope contacts a second slope on the fluid device. The first slope at least partially includes two or more pressing areas, which are annular steps and contact two or more pressed areas in the second slope, and the pressed areas are annular steps.

According to a fourth aspect of the invention, a gasket is to be mounted on a fluid device, including an annular attaching portion that has a first slope at an axial end. The first slope contacts a second slope on the fluid device. The first slope at least partially includes two or more pressing areas, which are annular protrusions and contact two or more pressed areas in the second slope.

DESCRIPTION OF THE EMBODIMENTS

A First Embodiment of the Invention

As shown in FIGS. 1-4, a gasket-mounting structure according to the first embodiment of the invention is used to mount a gasket 1 on a first fluid device 3. The structure is also used to mount the gasket 1 on a second fluid device 5. The structure connects the first fluid device 3 to the second fluid device 5. One of the fluid devices 3 and 5 is located at an upper portion of the flow of fluid, and the other is at a lower portion of the flow. The gasket 1 is placed between the fluid devices 3 and 5.

Note that the fluid devices 3 and 5 on which the gasket 1 is mounted are devices relating to fluid that include, but are not limited to, integrated panels, valves, pumps, accumulators, fluid reservoirs, heat exchangers, regulators, pressure gauges, flowmeters, heaters, and flange pipes.

Figure 3:
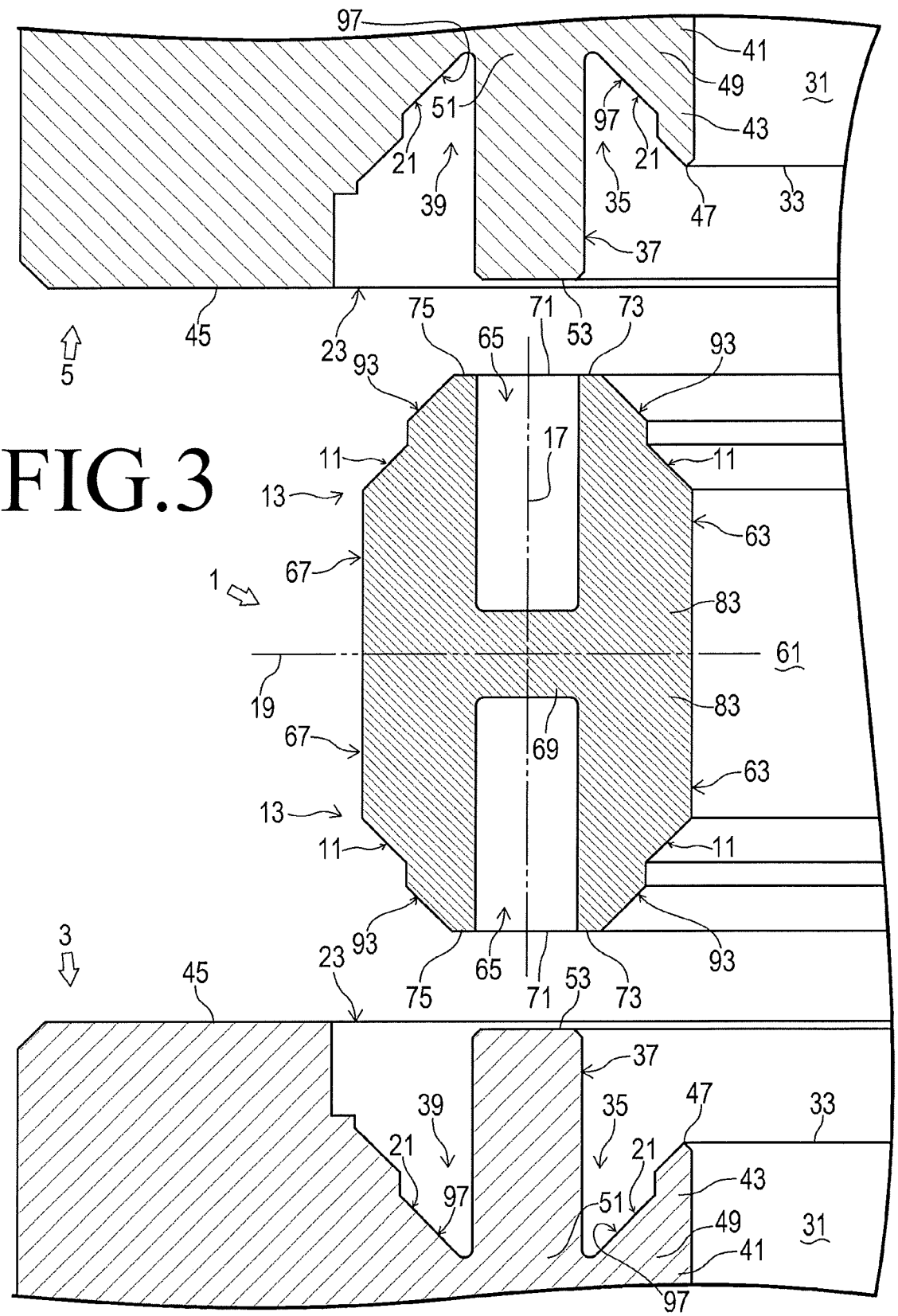
FIG. 3 is an exploded view of the gasket-mounting structure of FIG. 2.

The gasket 1 is a ring with a constant inner diameter. The gasket 1 includes an annular attaching portion 13 at a first axial end and another attaching portion 13 at a second axial end. Each attaching portion 13 has a first slope 11 at an axial end. A cross section of the gasket 1 that includes the axis 15 of the gasket 1 is symmetric with respect to the axis 15. The annular portion of the gasket 1 that defines the hole of the gasket 1 has an H-shaped cross section, on which the shapes of the attaching portions 13 are based. As shown in FIG. 3, the H-shaped cross section is symmetric with respect to a first virtual line 17 parallel to the axis 15 of the gasket 1 and passing through the radial center of the H-shaped cross section. The H-shaped cross section is also symmetric with respect to a second virtual line 19 perpendicular with the first virtual line 17.

Instead of the ring including the annular portion with the H-shaped cross section, the gasket 1 may be a ring including another annular portion that has the attaching portion(s) 13 inside one or both of the axial ends of the gasket 1, i.e. on a side of the axial end(s) facing a fluid channel 61 described later.

The first fluid device 3 includes an annular attached portion 23 with a second slope 21 that contacts the first slope 11. The second fluid device 5 also includes an annular attached portion 23 with a second slope 21 that contacts another first slope 11. The attached portion 23 of the first fluid device 3 is located below the attached portion 23 of the second fluid device 5. The attached portions 23 are adjacent to each other and arranged coaxially to face each other across the gasket 1.

The structure allowing the first axial side (the downside in FIG. 1) of the gasket 1 to be mounted on the first fluid device 3 is equivalent to the structure allowing the second axial side (upside) of the gasket 1 to be mounted on the second fluid device 5. Thus, the following will mainly explain the structure at the first fluid device 3.

Figure 1:
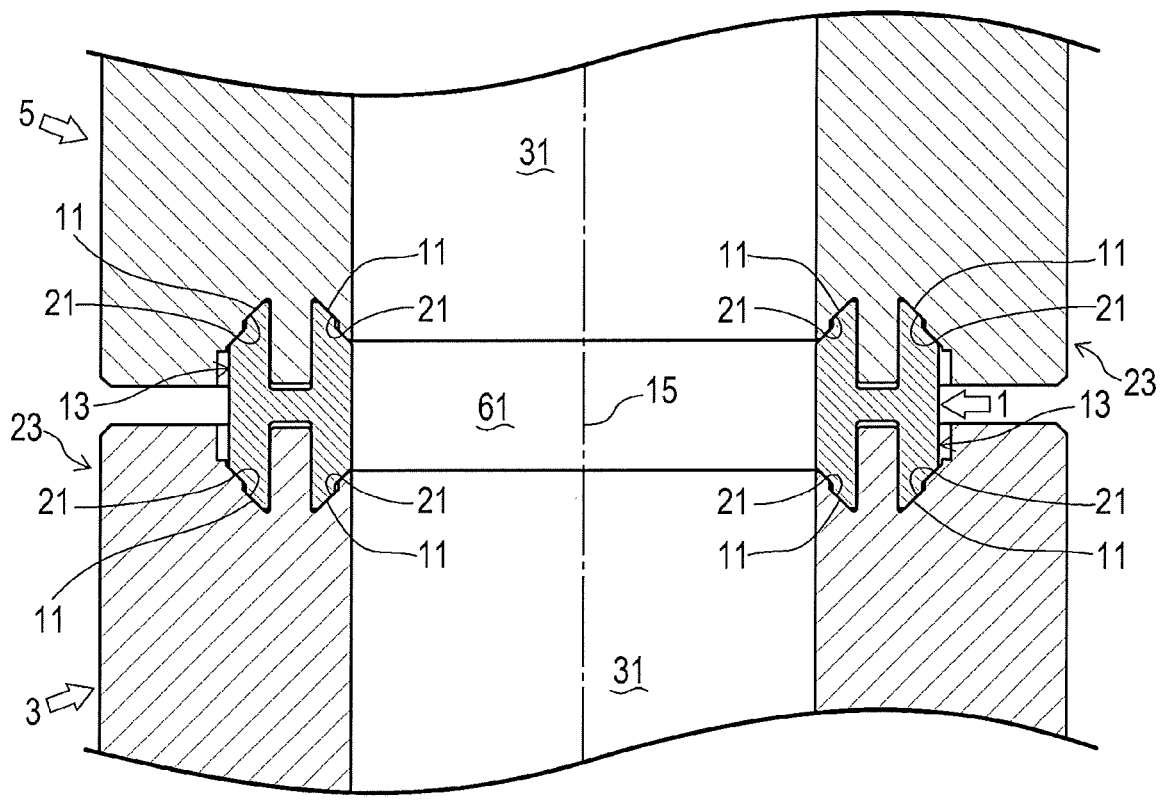
FIG. 1 is a cross-section view of a gasket-mounting structure according to a first embodiment of the invention.
Figure 2:
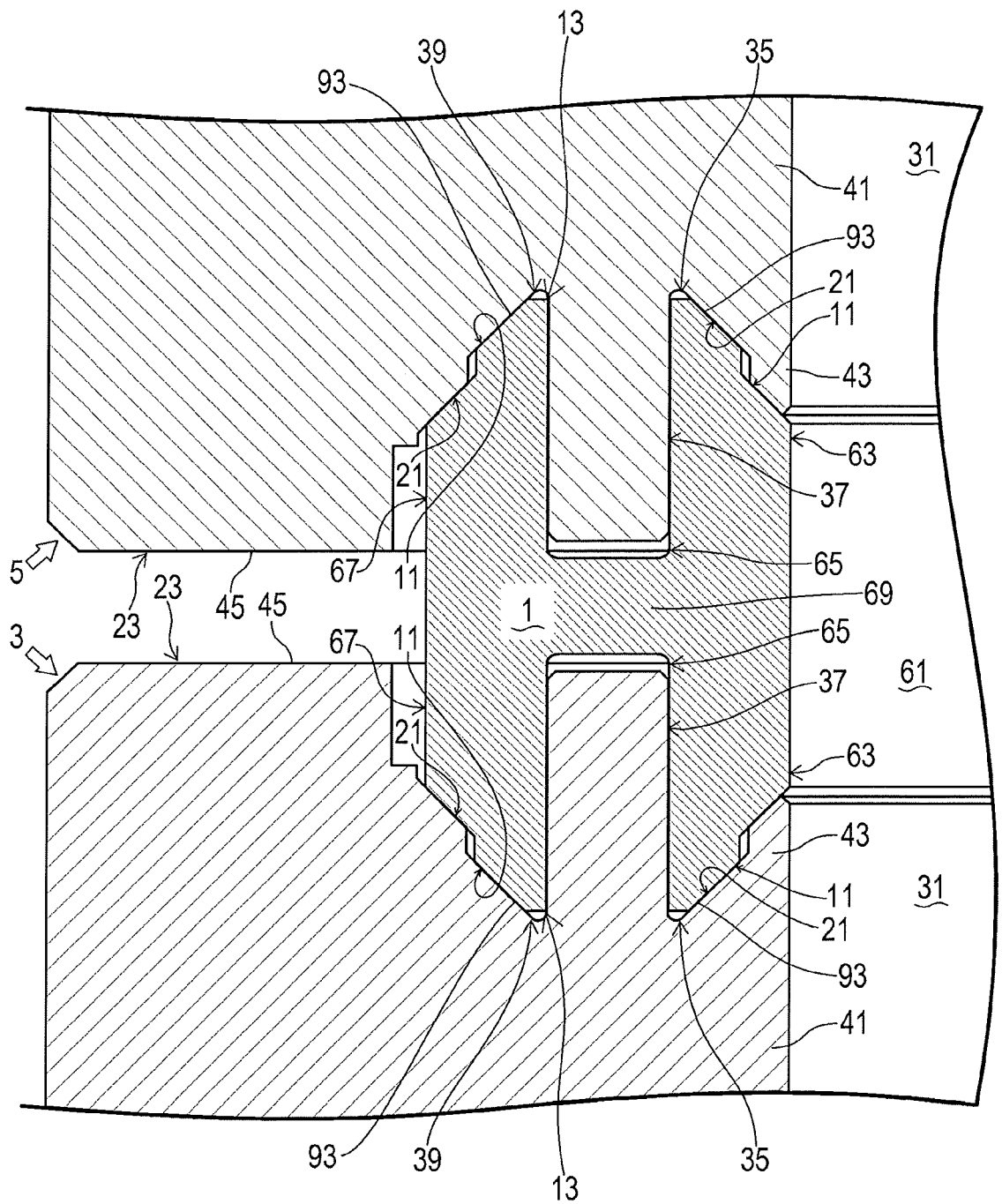
FIG. 2 is a partially enlarged cross-section view of the gasket-mounting structure of FIG. 1.

The attached portion 23 of the first fluid device 3 is placed at a second axial end of the first fluid device 3, its upper end in FIG. 1. The attached portion 23 encloses a first fluid channel 31, which has a circular cross section and extends along the axis of the gasket 1 mounted on the first fluid device 3, i.e. in a vertical direction in FIG. 1. The first fluid channel 31 is a hole, i.e. an inner space, of the annular attached portion 23. The first fluid channel 31 is open towards the gasket 1, upwards in FIG. 1. The opening 33 of the first fluid channel 31 is placed lower than a second axial (upper) end 45 of the attached portion 23.

The attached portion 23 is made from certain thermoplastic resin, which includes, for example, fluoropolymer such as perfluoroalkoxy alkane (PFA) and polytetrafluoroethylene (PTFE). Alternatively, the fluoropolymer may be polychlorotrifluoroethylene (PCTFE) or ethylene-tetrafluoroethylene copolymer (ETFE). As usage, the attached portion 23 may be made from polypropylene (PP), high-density polyethylene (HDPE), low-density polyethylene (LDPE), or polyoxymethylene (POM).

The attached portion 23 includes an annular inner concave 35, an annular convex 37, and an annular outer concave 39 to contact the attaching portion 13 of the gasket 1 when the gasket 1 is mounted on the first fluid device 3. The opening 33 of the first fluid channel 31 is surrounded by the inner concave 35, which is surrounded by the convex 37, which is surrounded by the outer concave 39. The inner concave 35, the convex 37, and the outer concave 39 extend in the axial direction (the vertical direction in FIG. 2), along which the gasket 1 approaches the first fluid device 3 when the gasket 1 is being mounted on the first fluid device 3. The inner concave 35, the convex 37, and the outer concave 39 are coaxial with each other and the first fluid channel 31.

The inner concave 35 has a shape that fits an inner protrusion 63 of the gasket 1, which will be described later. The inner concave 35 is open toward the gasket 1 (upward in FIG. 2) and extends around the opening 33 of the first fluid channel 31 in a circumferential direction of the attached portion 23.

The convex 37 has a shape that fits a groove 65 of the gasket 1, which will be described later. The convex 37 protrudes from the body 41 of the first fluid device 3 toward the gasket 1 (upward in FIG. 2) and extends around the inner concave 35 in a circumferential direction of the attached portion 23.

The outer concave 39 has a shape that fits an outer protrusion 67 of the gasket 1, which will be described later. The outer concave 39 is open toward the gasket 1 (upward in FIG. 2) and extends around the convex 37 in a circumferential direction of the attached portion 23.

In a radial direction of the attached portion 23, a protrusion 43 is located between the opening 33 of the first fluid channel 31 and the convex 37. The protrusion 43 extends from the body 41 of the first fluid device 3 toward the gasket 1 (upward in FIG. 2). The protrusion 43 also extends in a circumferential direction of the attached portion 23 around the opening 33 of the first fluid device 31. The protrusion 43 has an annular shape with a constant inner diameter and tapers toward a first axial (upper) end surface 45 of the attached portion 23. The protrusion 43, together with the convex 37, forms the inner concave 35. The shape of the protrusion 43 reduces a cross-section area of the inner concave 35 with increase in distance from the opening of the inner concave 35.

The outer periphery of the protrusion 43 includes the second slope 21, which has a concave (e.g. stepwise) shape. The second slope 21 has a first portion near the tip end 47 (upper end in FIG. 3) of the protrusion 43 and a second portion near the base (lower) end 49 of it. The first portion is located at a distance from the convex 37 in a radial direction of the attached portion 23. The second portion is connected to the base end 51 of the convex 37. The first portion of the second slope 21 is located radially inside the second portion of it. The second slope 21 is thus inclined to increase its radius with increase in distance from the tip (upper) end 47 of the protrusion 43. The second slope 21 includes two areas, a first pressed area 95A and a second pressed area 95B described later, which are continuously aligned in the gradient direction of the second slope 21.

The inner concave 35 and the outer concave 39 are symmetric with respect to the convex 37. Like the inner concave 35 defined by the convex 37 and the second slope 21, the outer concave 39 is defined by the convex 37 and another second slope 21.

The convex 37 is lower than the second axial (upper) end surface 45 of the attached portion 23. To be exact, the tip end 53 of the convex 37 is located in an axial direction of the attached portion 23 nearer to the body 41 of the first fluid device 3 than the second axial end surface 45 of the attached portion 23.

The (attaching portion 13 of the) gasket 1 is made from certain thermoplastic resin, which include, for example, fluoropolymer such as PFA and PTFE. Alternatively, the fluoropolymer may be PCTFE or ETFE. As usage, the gasket 1 may be made from PP, HDPE, LDPE, or POM.

The gasket 1 encloses a second fluid channel 61, which is a through hole in an axial direction of the annular body of the gasket 1. The second fluid channel 61 has a circular cross section perpendicular to the axial direction, a vertical direction in FIG. 1, and extends in the axial direction. The second fluid channel 61 has a constant diameter, which corresponds to the inner diameter of the gasket 1 and equals the diameter of the first fluid channel 31, which corresponds to the inner diameter of the attached portion 23. The second fluid channel 61 is coaxial with the first fluid channel 31. The second fluid channel 61 is open toward the first fluid device 3 (downward in FIG. 1) at the first axial end (lower end in FIG. 1) of (the attaching portion 13 of) the gasket 1. Through the opening, the second fluid channel 61 is connected to the first fluid channel 31.

The attaching portion 13 on the first axial side of the gasket 1 includes an annular inner protrusion 63, an annular groove 65, and an annular outer protrusion 67, which are mounted on the attached portion 23 of the first fluid device 3. The inner protrusion 63, the groove 65, and the outer protrusion 67 extend in an axial direction of the gasket 1 (a vertical direction in FIG. 1). The second fluid channel 61 is surrounded by the inner protrusion 63, which is surrounded by the groove 65, which is surrounded by the outer protrusion 67. The inner protrusion 63, the groove 65, and the outer protrusion 67 are coaxial with each other and the second fluid channel 61.

The inner protrusion 63 protrudes from the axial center 69 of the gasket 1 toward the first axial direction (downward in FIG. 2) and extends around the second fluid channel 61 in a circumferential direction of the attaching portion 13. The inner protrusion 63 has a shape that fits the inner concave 35 of the first fluid device 3.

The groove 65 is defined by the inner protrusion 63, the outer protrusion 67, and the axial center 69 of the gasket 1. The groove 65 is open toward the first axial direction of the gasket 1 (downward in FIG. 2) and extends around the inner protrusion 63 in a circumferential direction of the attaching portion 13. The opening 71 of the groove 65 is located at the same axial position as the tip end 73 of the inner protrusion 63 and the tip end 75 of the outer protrusion 67. The groove 65 has a shape that fits the convex 37 of the first fluid device 3. When the attaching portion 13 is mounted on the attached portion 23, the groove 65 engages with the convex 37 and the inner periphery of the groove 65 is pressed against the convex 37.

The outer protrusion 67 protrudes from the axial center 69 of the gasket 1 toward the first axial direction (downward in FIG. 2) and extends around the groove 65 in a circumferential direction of the attaching portion 13. The outer protrusion 67 has a shape that fits the outer concave 39 of the first fluid device 3.

The inner protrusion 63 has a portion near the tip end 73, i.e. a lower portion in FIG. 3. The portion tapers toward the tip end surface 81, i.e. the lower end surface in FIG. 4. The portion includes an inner periphery with the annular first slope 11 and an outer periphery facing the groove 65.

The first slope 11 has a first area near the tip (lower) end 73 of the inner protrusion 63 and a second area near the base (upper) end 83 of it. The first area is connected to the tip end surface 81 at the tip end 73 of the inner protrusion 63. The second area is connected to the inner circumferential surface 85 of the inner protrusion 63. The first slope 11 has a shape inclined with respect to the axis 15 of the gasket 1 so that the first slope 11 can contact and press the whole periphery of the annular second slope 21, which is inclined with respect to the axis of the attached portion 23. Note that the axis of the attached portion 23 and the axis 15 of (the attaching portion 13 of) the gasket 1 are colinear with each other.

The first slope 11 includes two areas, a first pressing area 91A and a second pressing area 91B described later, which are continuously aligned in the gradient direction of the first slope 11. Due to the gradient direction of the first slope 11, areas of the first slope 11 closer to the groove 65 are located farther from the base end 83 of the inner protrusion 63. The first slope 11 has a stepwise shape, whose steps each fit a step of the second slope 21. Thus, at least a part of the first slope 11 and at least a part of the second slope 21 contacts and presses each other to seal a gap between the slopes 11 and 21.

The first (lower) area of the first slope 11 is located radially outside the second (upper) area of it. Except the boundary between the steps, the first slope 11 is thus inclined to increase its radius with increase in distance from the base (upper) end 83 of the inner protrusion 63. Due to the first slope 11, portions of the inner protrusion 63 nearer its tip end 73, i.e. lower portions in FIG. 3, has larger diameters than portions of the inner protrusion 63 nearer its base end 83, i.e. upper portions in FIG. 3.

Figure 4:
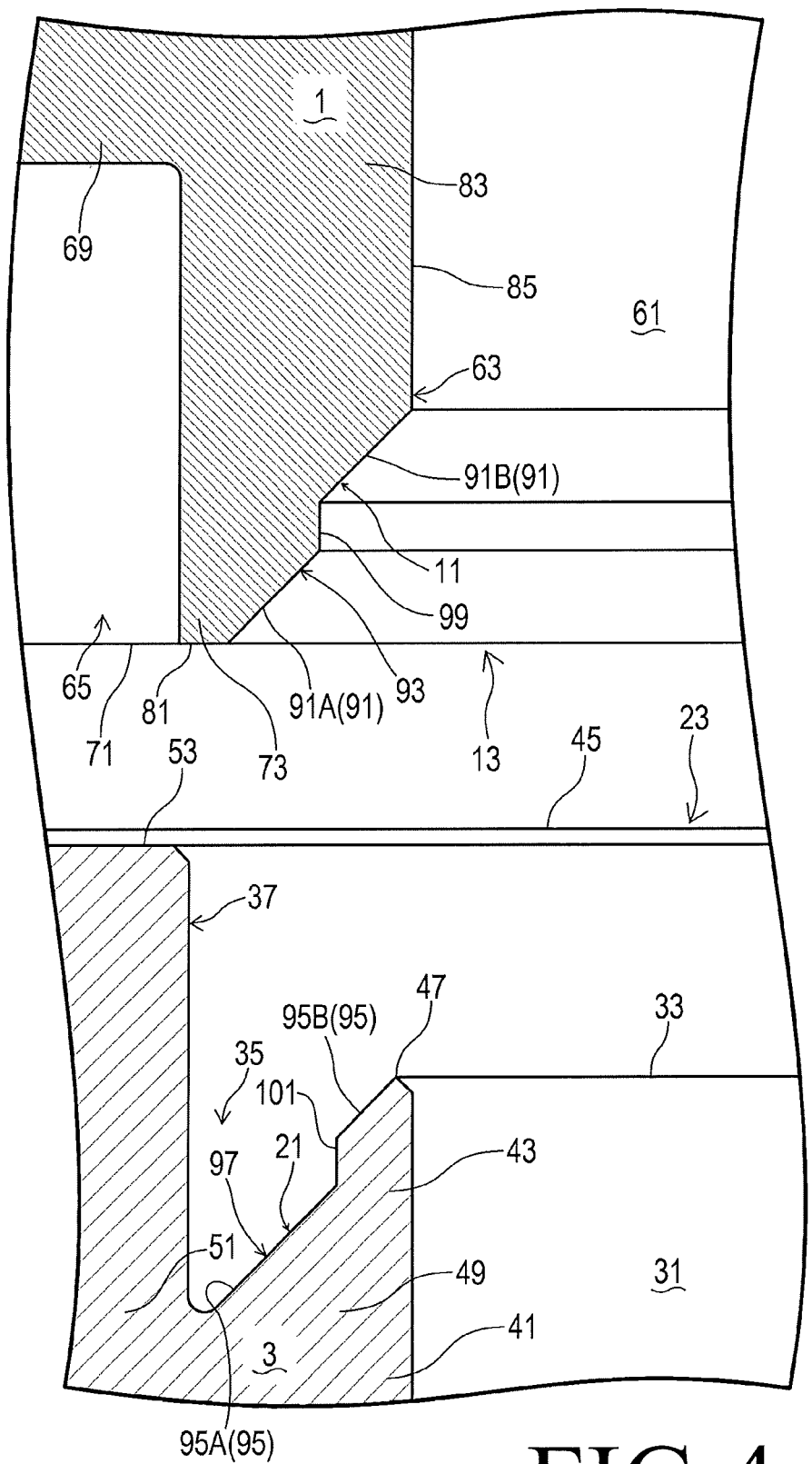
FIG. 4 is a partially enlarged view of FIG. 3.

The first slope 11 has an annular shape that extends throughout the inner periphery of the gasket 1. The first area of the first slope 11 is continuously connected to the tip end surface 81 of the tip end 73 of the inner protrusion 63. The second area of the first slope 11 is continuously connected to the inner circumferential surface 85 of the inner protrusion 63. At least a part of the first slope 11 includes two pressing areas 91, which are annular steps 93. At least a part of the second slope 21 includes two pressed areas 95, which are annular steps 97 and fit the pressing areas 91. The annular steps 93 each extend in the gradient direction of the first slope 11 throughout the whole circumference of it and serve as one of the pressing areas 91. As shown in FIG. 4, the pressing areas 91 include a first pressing area 91A and a second pressing area 91B, which is located radially inside the first pressing area 91A. The first pressing area 91A and the second pressing area 91B correspond the treads of the annular steps 93. Note that the annular steps 91 according to the first embodiment have two treads, but the annular steps may have three or more treads. The first pressing area 91A has a straight slope (tapered surface), which is a part of the first slope 11 and extends throughout the whole circumference of the attaching portion 13. The second pressing area 91B has a straight slope (tapered surface), which is another part of the first slope 11 and extends throughout the whole circumference of the attaching portion 13. The first pressing area 91A and the second pressing area 91B form the entirety of the first slope 11. The pressing areas 91A and 91B have the same gradient and are partitioned by a riser 99. Note that the first pressing area 91A and the second pressing area 91B may have different gradients.

The first pressing area 91A and the second pressing area 91B are brought into contact with the second slope 21 at the same time. Alternatively, one of the pressing areas 91A and 91B may be brought into contact with the second slope 21 earlier than the other. Preferably, the second pressing area 91B is brought into contact with the second slope 21 earlier than the first pressing area 91A. This improves sealing performance.

The pressing areas 91 each contact one of the pressed areas 95, i.e. the annular steps 97 in the second slope 21. The second slope 21 has a ring extends throughout the whole circumference of the attached portion 23 of the first fluid device 3. The annular steps 97 each extend in the gradient direction of the second slope 21 throughout the whole circumference of it and serve as one of the pressed areas 95. As shown in FIG. 4, the pressed areas 95 include a first pressed area 95A and a second pressed area 95B, which is located radially inside the first pressed area 95A. The first pressed area 95A and the second pressed area 95B correspond the treads of the annular steps 97. Note that the annular steps 97 have two treads, but the annular steps may have three or more treads. The first pressed area 95A has a straight slope (tapered surface), which is a part of the second slope 21 and extends throughout the whole circumference of the attached portion 23. The second pressed area 95B has a straight slope (tapered surface), which is another part of the second slope 21 and extends throughout the whole circumference of the attached portion 23. The first pressed area 95A and the second pressed area 95B form the entirety of the second slope 21. The pressed areas 95A and 95B have the same gradient and are partitioned by a riser 101. The gradients of the pressed areas 95A and 95B are appropriately designed depending on the gradients of the pressing areas 91A and 91B. The first pressing area 91A and the first pressed area 95A may have the same gradient or different gradients. The second pressing area 91B and the second pressed area 95B may have the same gradient or different gradients.

The inner protrusion 63 and the outer protrusion 67 are symmetric with respect to the groove 65. The outer protrusion 67 is symmetric with respect to the second virtual line 19 (cf. FIG. 3). In the figures, components of the outer protrusion 67 are marked by the same reference numbers as symmetric components of the inner protrusion 63. Description on the components of the outer protrusion 67 can be found in description on the symmetric components of the inner protrusion 63.

When the gasket 1 is being mounted on the first fluid device 3, i.e. it is being changed from a position separated from the first fluid device 3 (cf. FIGS. 3 and 4) to the position mounted on it (cf. FIGS. 1 and 2), the attaching portion 13 on the first axial side (downside) of the gasket 1 approaches the attached portion 23 of the first fluid device 3. The inner protrusion 63 of the attaching portion 13 contacts the inner concave 35 of the attached portion 23. The groove 65 of the attaching portion 13 contacts the convex 37 of the attached portion 23. The outer protrusion 67 of the attaching portion 13 contacts the outer concave 39 of the attached portion 23. In a similar manner, the gasket 1 also contacts the second fluid device 5.

Figure 5:
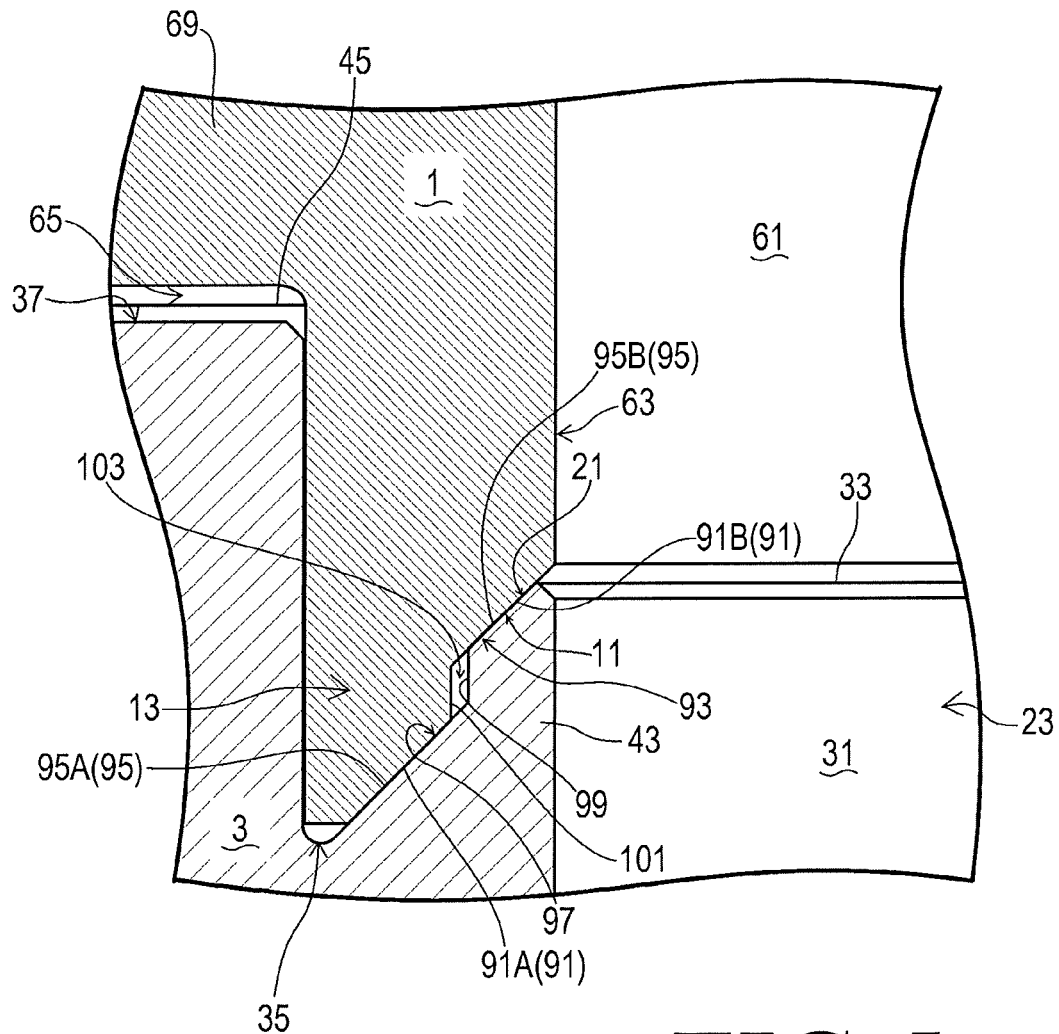
FIG. 5 shows the gasket of FIG. 3 after it completely contacts the fluid device of FIG. 3.

Next, a coupling means not shown in the figures couples the first fluid device 3 with the second fluid device 5. The fluid devices 3 and 5 are tightly pulled toward each other and squeezed. As shown in FIG. 5, the pressing areas 91 of the first slope 11 then contact the pressed areas 95 of the second slope 21. The coupling means includes, but is not limited to, a hole, a nut, and a bolt. The hole is opened at one of the first fluid device 3 and the second fluid device 5. The nut is attached to the other of the fluid devices 3 and 5. The bolt passes through the hole and is screwed into the nut. Continuing to squeeze the fluid devices 3 and 5, the coupling means presses the pressing areas 91 of the first slope 11 against the pressed areas 95 of the second slope 21. Thus, a firmly attached area appears in at least a part between the first slope 11 and the second slope 21. Then, the inner protrusion 63 of the attaching portion 13 is engaged with the inner concave 35 of the attached portion 23. The groove 65 of the attaching portion 13 is engaged with the convex 37 of the attached portion 23. The outer protrusion 67 of the attaching portion 13 is engaged with the outer concave 39 of the attached portion 23. As a result, the attaching portion 13 is mounted on the attached portion 23. When the gasket 1 is completely mounted on the fluid devices 3 and 5, the first slope 11 and the second slope 21 form a first sealing area in which a sealing force acts in an axial direction, and the convex 37 and the groove 65 form a second sealing area in which a sealing force acts in a radial direction.

Firm contact of the pressing areas 91 of the first slope 11 with the pressed areas 95 of the second slope 21 enables at least one annular sealing area to appear between the slopes 11 and 21. To be exact, at least one pair of the pressing areas 91A, 91B and the pressed areas 95A, 95B enables a sealing area to appear between the slopes 11 and 21. Thus, at least one sealing area is easily ensured between the slopes 11 and 21. As a result, the gap between the gasket and the fluid devices can be surely and easily sealed.

As shown in FIG. 5, there is an annular space 103 between the pressing areas 91A and 91B which are adjacent to each other in the gradient direction of the first slope 11 and between the pressed areas 95A and 95B which are adjacent to each other in the gradient direction of the second slope 21. The annular space 103 is defined by the risers 99 and 101 facing each other and facing parts of the second pressing area 91B and the first pressed area 95A. The annular space 103 is adjacent to the sealing areas (between the first pressing area 91A and the first pressed area 95A and between the second pressing area 91B and the second pressed area 95B) in the gradient direction of the slopes 11 and 21. Since (the attaching portion 13 of) the gasket 1 and the attached portion 23 of the first fluid device 3 are made from resin, the pressing areas 91 of the first slope 11 and the pressed areas 95 of the second slope 21 are deformed when they contact each other. The deformed parts of the pressing areas 91 and the pressed areas 95 can escape into the annular space 103, and thus proper contact conditions of the pressing areas 91 and the pressed areas 95 can be ensured.

Figure 6:
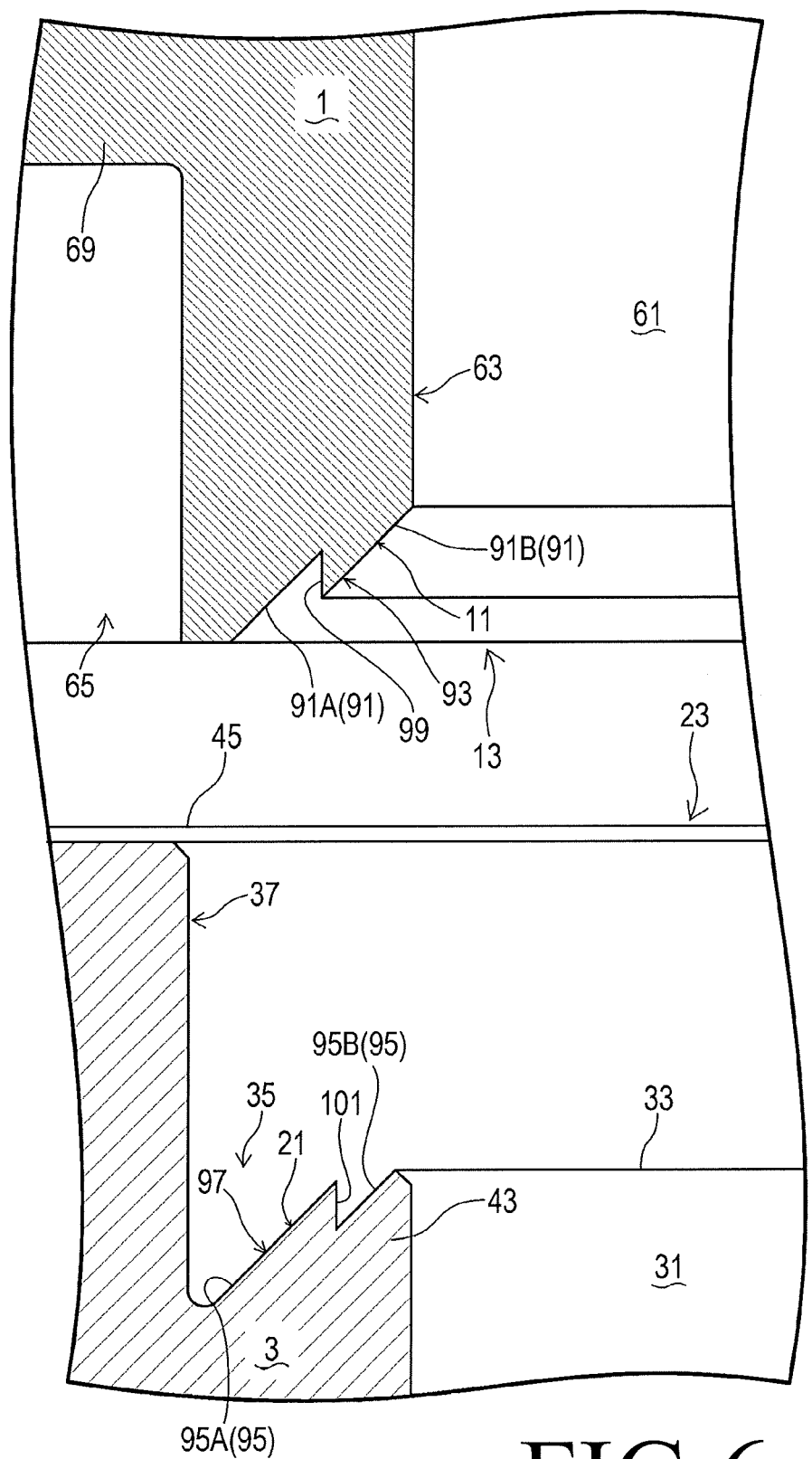
FIG. 6 shows a gasket-mounting structure of another embodiment of the invention before a gasket is brought into contact with a fluid device.
Figure 7:
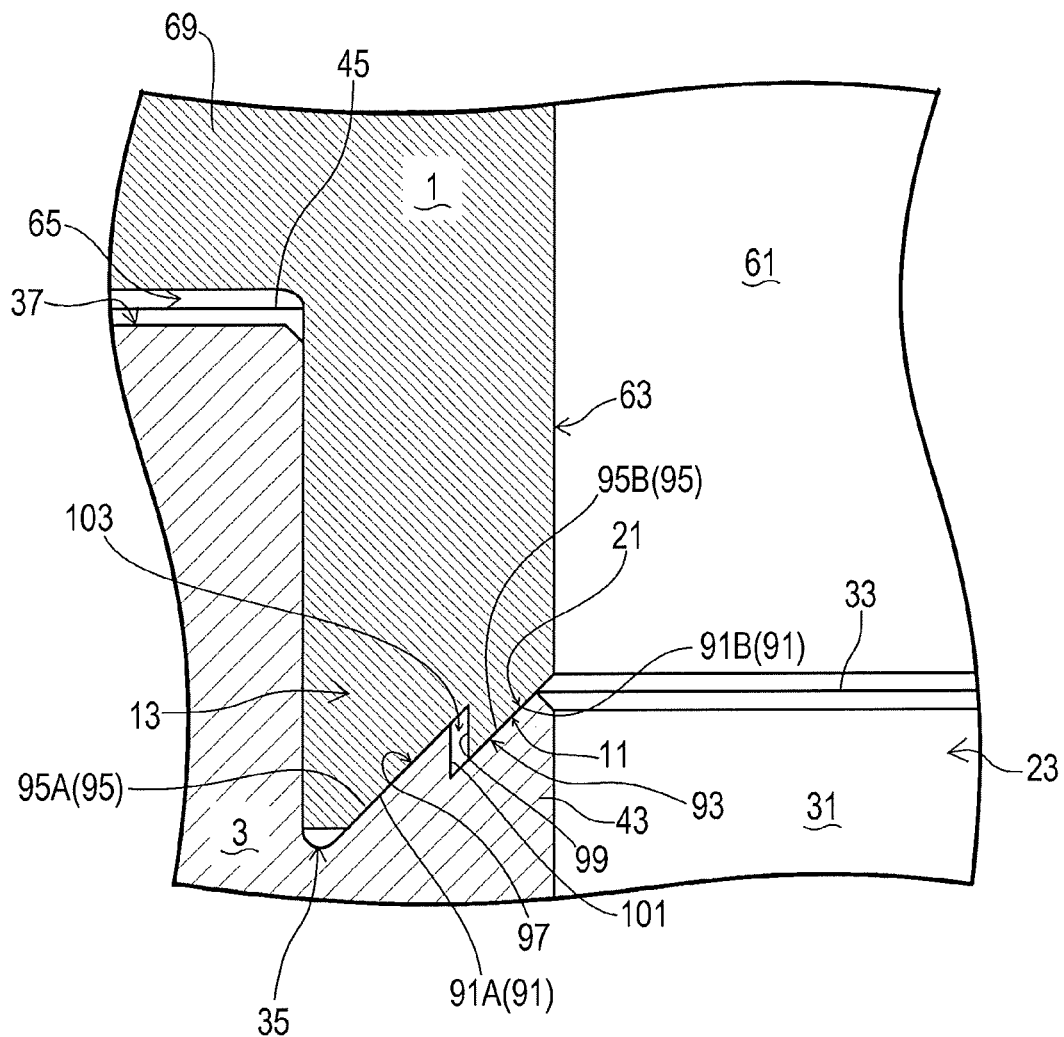
FIG. 7 shows the gasket-mounting structure of FIG. 6 after the gasket completely contacts the fluid device.

Note that the annular steps 93 of the first slope 11 and the pressed areas 95 of the second slope 21 are not limited to a stepwise shape. For example, they may have a saw-edged shape as shown in FIGS. 6 and 7.

A Second Embodiment of the Invention

Figure 8:
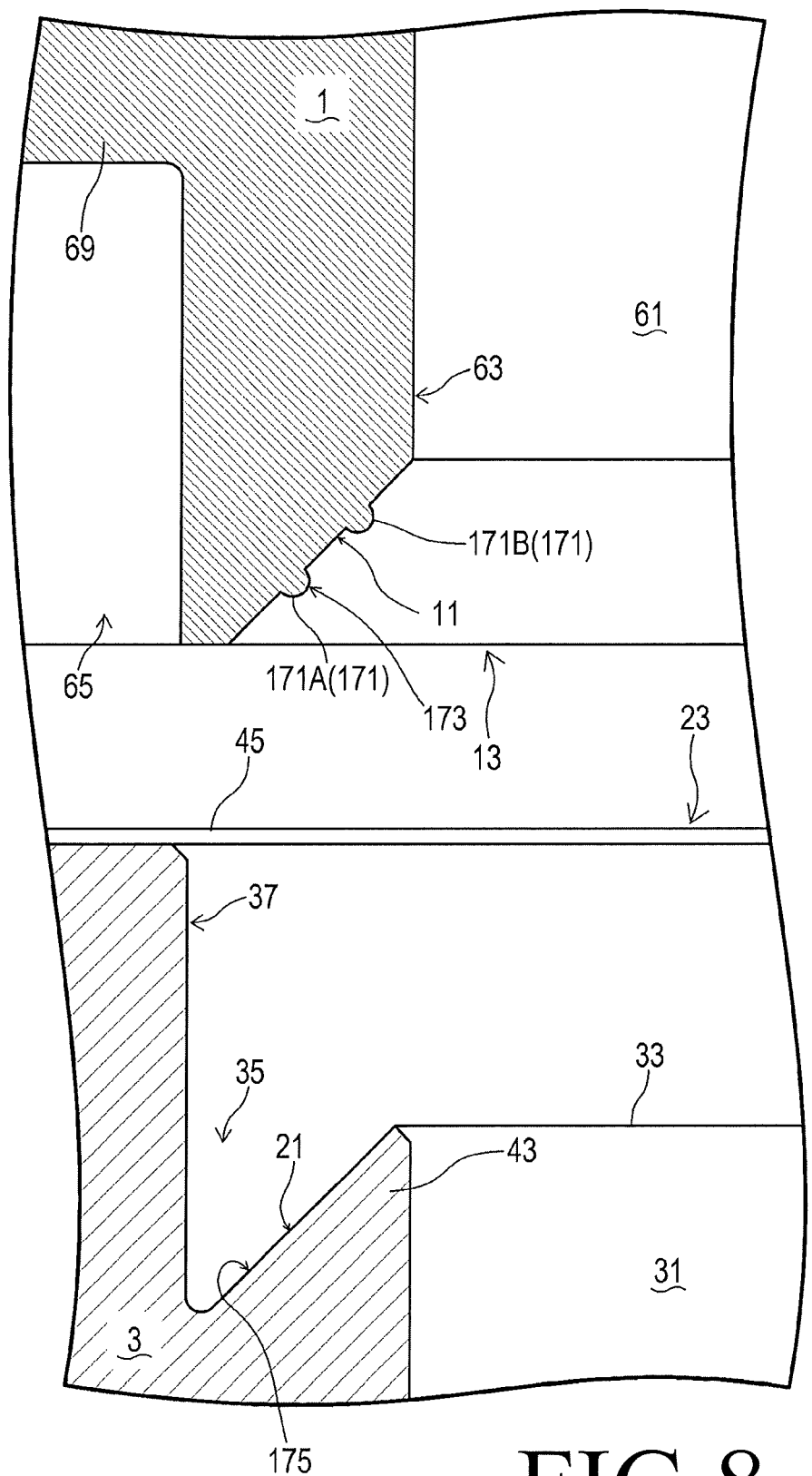
FIG. 8 shows a gasket-mounting structure of a second embodiment of the invention before a gasket is brought into contact with a fluid device.
Figure 9:
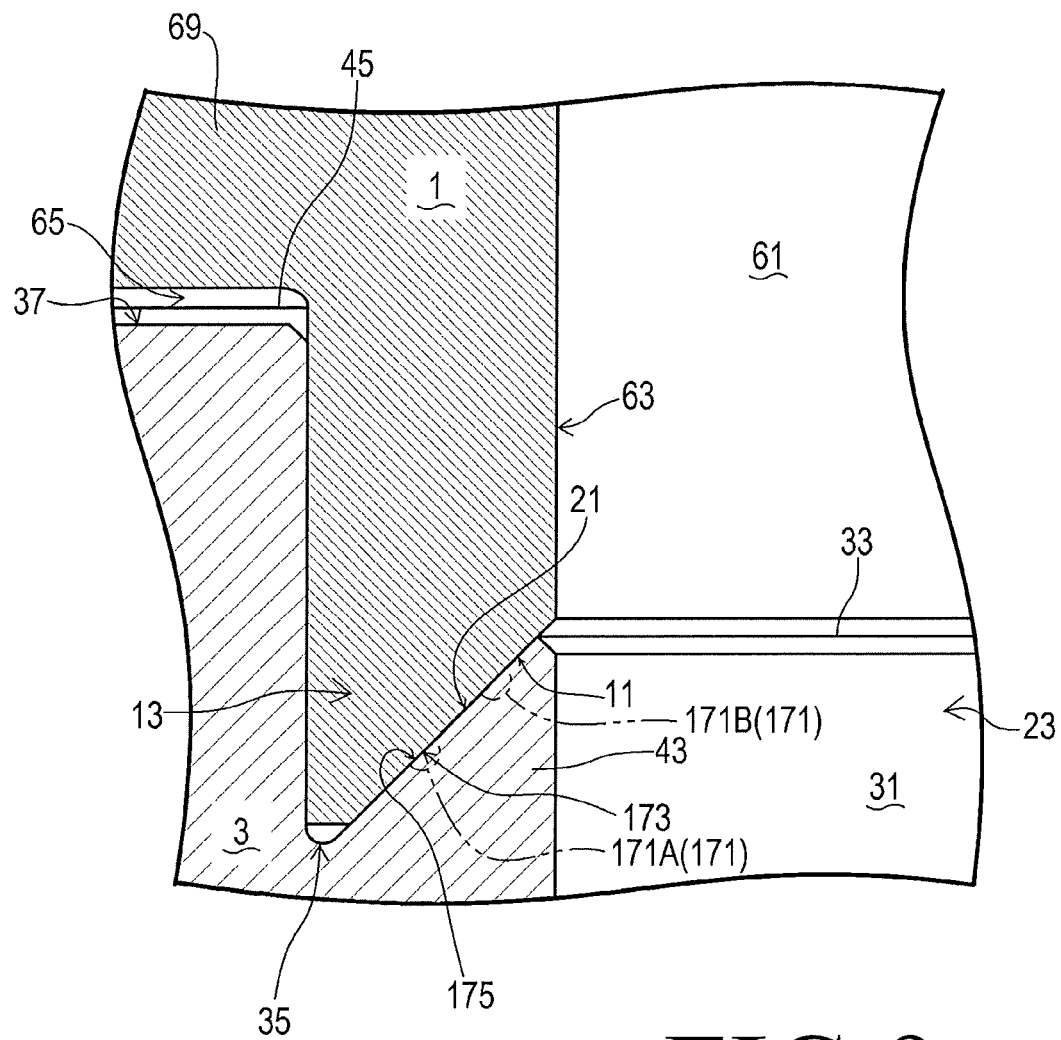
FIG. 9 shows the gasket-mounting structure of FIG. 8 after the gasket completely contacts the fluid device.

The second embodiment differs from the first embodiment in that, as shown in FIGS. 8 and 9, one of the slopes 11 and 21 has two or more pressing areas 171, which are annular protrusions 173, and the other of the slopes 11 and 21 has two or more pressed areas 175, which contact the pressing areas 171.

The first slope 11 has the pressing areas 171, which are placed at intervals in the gradient direction of the first slope 11. The pressing areas 171 include a first pressing area 171A and a second pressing area 171B, which is located radially inside the first pressing area 171A. The first pressing area 171A and the second pressing area 171B are placed at a distance from each other in the gradient direction of the first slope 11. Note that the number of the pressing areas is not limited to two but may be three or more. As shown in FIG. 8, the first pressing area 171A protrudes from the straight slope of the first slope 11 toward the radial inside of the attaching portion 13. The first pressing area 171A extends throughout the whole circumference of the attaching portion 13. The second pressing area 171B protrudes from the first slope 11 toward the radial inside of the attaching portion 13. The second pressing area 171B extends throughout the whole circumference of the attaching portion 13. The pressing areas 171A and 171B have the same shape, which meets the condition that the pressing areas do not interrupt each other and can press the pressed areas 175 of the second slope 21. Note that the pressing areas may have different shapes if they meet the condition.

The second slope 21 has the pressed areas 175, which contact the pressing areas 171 of the first slope 11. The pressed areas 175 are annular surfaces, which are parts of the straight slope of the second slope 21. The pressed areas 175 extend throughout the whole circumference of the attached portion 23. Each of the pressed areas 175 faces one of the pressing areas 171, i.e. the annular protrusions 173, to contact it.

When the gasket 1 is being mounted on the first fluid device 3, i.e. it is being changed from the position separated from the first fluid device 3 (cf. FIG. 8) to the position mounted on it (cf. FIG. 9), the attaching portion 13 on the first axial side (downside) of the gasket 1 approaches the attached portion 23 of the first fluid device 3. The inner protrusion 63 of the attaching portion 13 contacts the inner concave 35 of the attached portion 23. The groove 65 of the attaching portion 13 contacts the convex 37 of the attached portion 23. The outer protrusion 67 of the attaching portion 13 contacts the outer concave 39 of the attached portion 23. In a similar manner, the gasket 1 also contacts the second fluid device 5.

Next, the above-described coupling means couples the first fluid device 3 with the second fluid device 5. The fluid devices 3 and 5 are tightly pulled toward each other and squeezed. The pressing areas 171 of the first slope 11 approach the pressed areas 175 of the second slope 21. Continuing to squeeze the fluid devices 3 and 5, the coupling means presses at least one of the pressing areas 171 against the corresponding one of the pressed areas 175. Thus, at least one of the sealing areas appears between the first slope 11 and the second slope 21. As shown in FIG. 9, the pressing areas 171 are squashed and tightly press the pressed areas 175. The inner protrusion 63 of the attaching portion 13 is engaged with the inner concave 35 of the attached portion 23. The groove 65 of the attaching portion 13 is engaged with the convex 37 of the attached portion 23. The outer protrusion 67 of the attaching portion 13 is engaged with the outer concave 39 of the attached portion 23. As a result, the attaching portion 13 is mounted on the attached portion 23.

When the gasket 1 is completely mounted on the fluid devices 3 and 5, the first slope 11 and the second slope 21 form a first sealing area in which a sealing force acts in an axial direction, and the convex 37 and the groove 65 form a second sealing area in which a sealing force acts in a radial direction.

Firm contact of the pressing areas 171 of the first slope 11 and the pressed areas 175 of the second slope 21 enables at least one annular sealing area to appear between the slopes 11 and 21. In the sealing area, the slopes 11 and 21 tightly press each other as described above. Accordingly, at least one of the pressing areas 171A and 171B, together with the pressed areas 175, can form the sealing area between the first slope 11 and the second slope 21. This facilitates surely sealing the gap between the gasket and the fluid devices.

Instead of the above-described structure, the second slope 21 may have two or more pressing areas 171, i.e. annular protrusions 173, and the first slope 11 may have pressed areas 175, which contact the pressing areas 171.

Slopes according to the invention may be straight slopes, such as the slopes 11 and 21 according to the above-described embodiments. Alternatively, slopes according to the invention may be curved (or rounded) slopes.

The above-described explanation teaches that the invention can obviously have variations and modifications. Accordingly, it should be understood that the invention can have embodiments other than those in the description within the scope of the claims attached to the description.

Supplement

Based on the above-described embodiments, the invention may be further characterized as follows.

The structure according to the first aspect of the invention includes an annular space between two of the pressing areas adjacent to each other in a gradient direction of the first slope and between two of the pressed areas contacting the adjacent pressing areas. When (the attaching portion of) the gasket and the attached portion of the fluid device are made from resin, contact of the pressing areas of the first slope and the pressed areas of the second slope deform them. The deformed parts of the pressing areas and the pressed areas can escape into the annular space, and thus proper contact conditions of the pressing areas and the pressed areas can be ensured.

In the structure according to the second aspect of the invention, the pressed areas are annular areas in the first slope or the second slope, whichever includes the pressed areas.

What is claimed is:

1. A structure allowing a gasket to be mounted on a fluid device, comprising:
   the gasket including an annular attaching portion that has a first slope at an axial end; and
   the fluid device including an annular attached portion with a second slope that contacts the first slope; wherein
   the first slope at least partially includes two or more pressing areas, which are annular steps,
   the second slope at least partially includes two or more pressed areas, which are annular steps to fit the pressing areas,
   there is an annular space between two of the pressing areas adjacent to each other in a gradient direction of the first slope and between two of the pressed areas contacting the adjacent pressing areas,
   the pressing areas form first stairs and the pressed areas form second stairs,
   each tread of the first stairs contacts a tread of the second stairs, and
   each riser of the first stairs faces a riser of the second stairs across the annular space.

2. The structure according to claim 1, wherein the riser of the first stairs and the riser of the second stairs each extend substantially in a vertical direction.

\* \* \* \* \*